United States Patent [19]
Keene

[11] Patent Number: 6,135,416
[45] Date of Patent: Oct. 24, 2000

[54] BUTTERFLY VALVE

[75] Inventor: Christopher Keene, Waltham, Mass.

[73] Assignee: Varian, Inc., Palo Alto, Calif.

[21] Appl. No.: 09/253,620

[22] Filed: Feb. 18, 1999

[51] Int. Cl.[7] .................................................. F16K 25/00
[52] U.S. Cl. .......................................... 251/162; 251/229
[58] Field of Search .................................... 251/160, 192, 251/229, 305, 308, 84, 85, 56, 58, 162

[56] References Cited

U.S. PATENT DOCUMENTS

| | | | |
|---|---|---|---|
| 3,857,545 | 12/1974 | Santi | 251/229 |
| 4,669,701 | 6/1987 | Tinner | 251/308 |
| 4,770,392 | 9/1988 | Schmidt | 251/308 |

*Primary Examiner*—Kevin Shaver
*Assistant Examiner*—Eric Keasel

*Attorney, Agent, or Firm*—Bella Fishman

[57] ABSTRACT

A butterfly valve includes a valve housing having a fluid conduit, a seal plate assembly including a seal plate, and a closure assembly. The closure assembly includes a main shaft mounted in the valve housing and rotatable about a longitudinal axis between an open position and an intermediate position, a crank shaft rotatable about the longitudinal axis between the open position and a closed position, a hub affixed to the main shaft and movably coupled to the seal plate assembly to permit translation of the seal plate assembly with respect to the hub, a roller engaging the seal plate assembly and mounted to the crank shaft for eccentric rotation about the longitudinal axis, and one or more springs coupled between the seal plate assembly and the hub for biasing the seal plate toward the intermediate position. The valve may include a valve actuator which rotates the crank shaft about the longitudinal axis between the open position and the closed position.

18 Claims, 5 Drawing Sheets

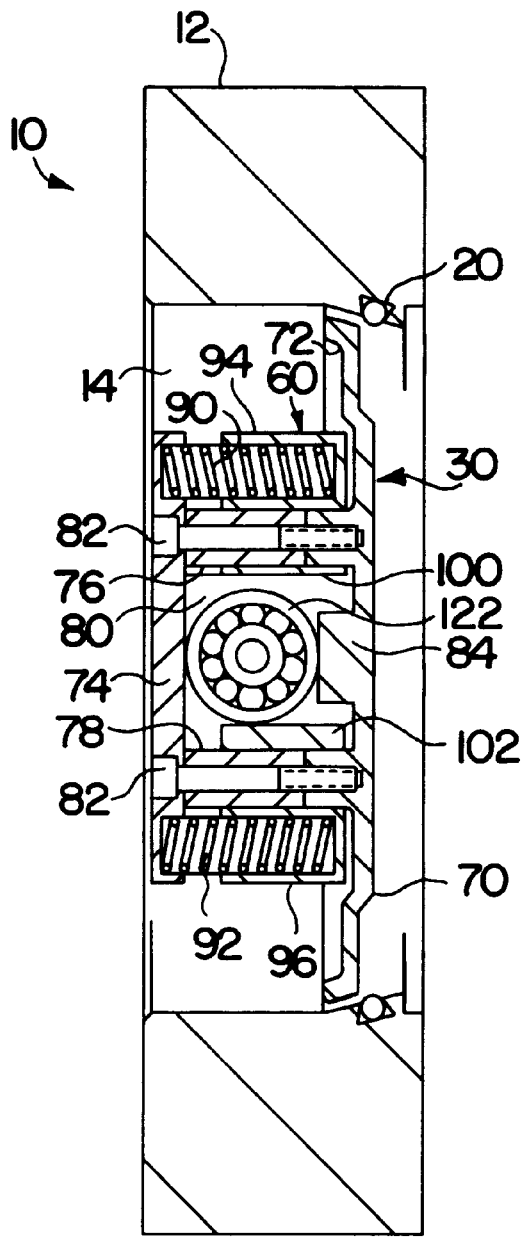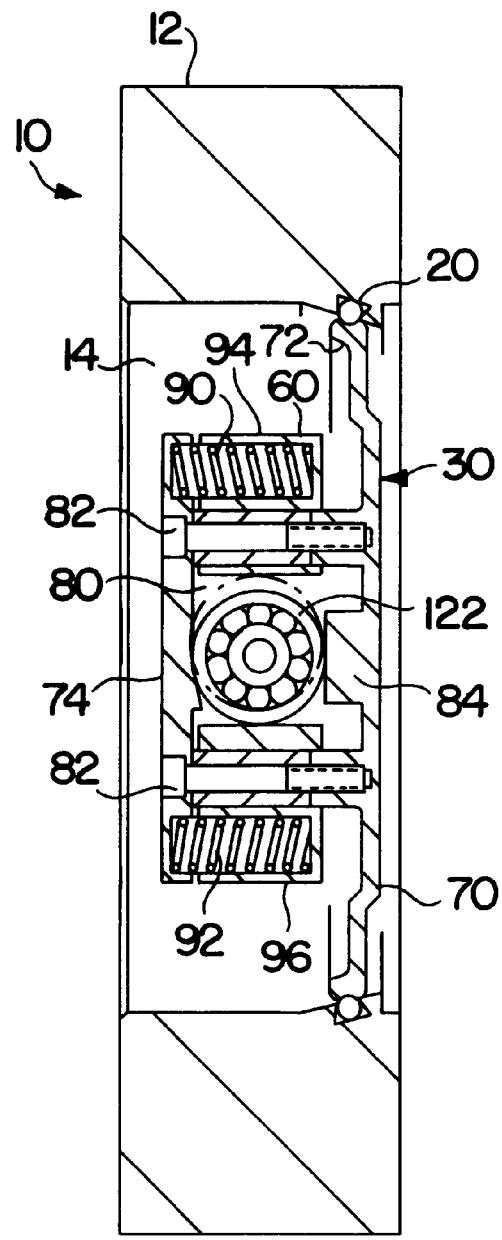

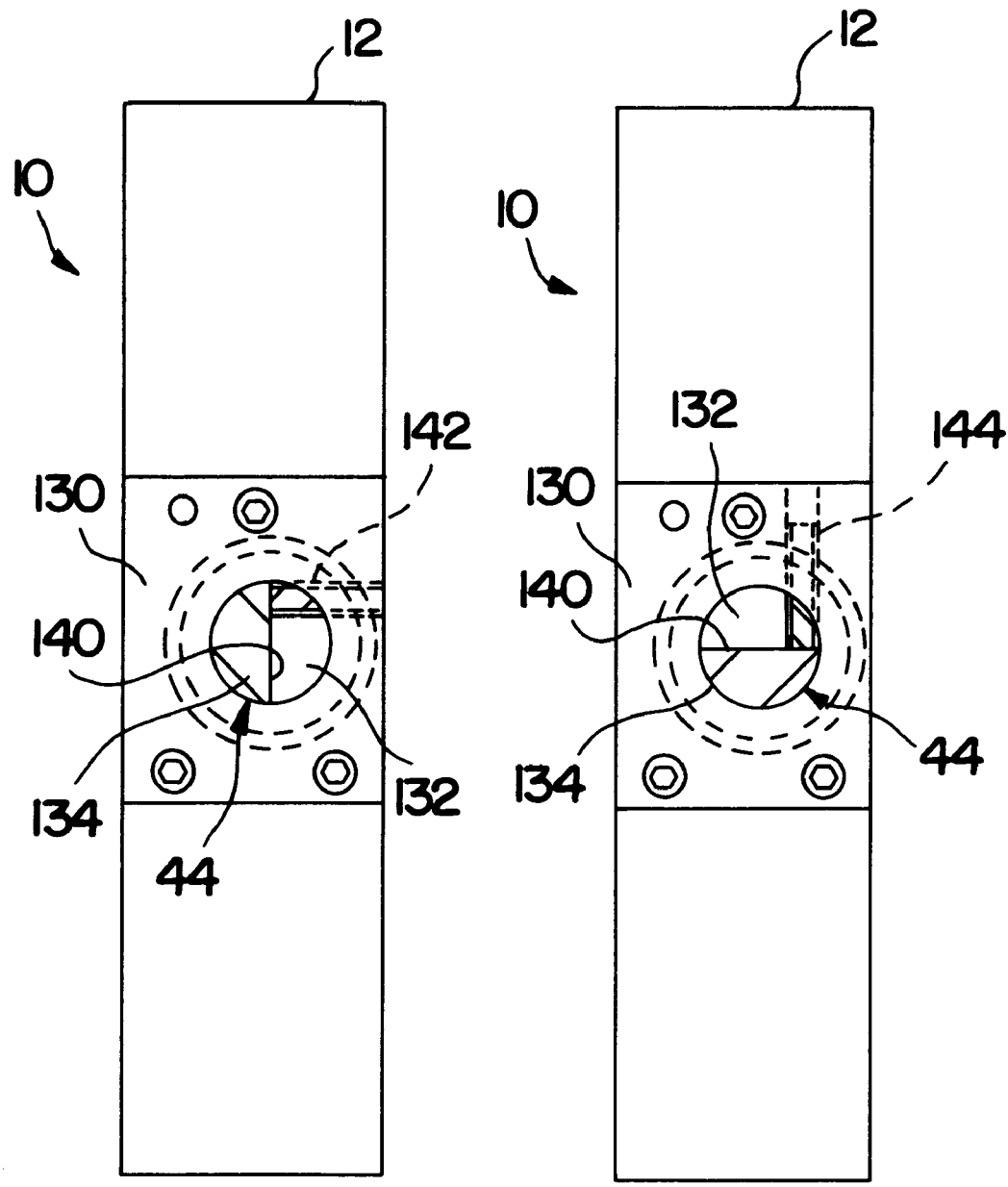

BUTTERFLY VALVE

FIELD OF THE INVENTION

This invention relates to butterfly valves and, more particularly, to butterfly valve mechanisms that provide a long operating life and exhibit low particulate generation.

BACKGROUND OF THE INVENTION

Conventional butterfly valve structures include a valve housing having a fluid conduit and a valve seat, a seal member that is movable between an open position and a closed position in the fluid conduit, and a mechanism for rotating the seal member between the open and closed positions. Typically, the seal member is a plate that is parallel to the direction of fluid flow in the open position and is rotated perpendicular to the direction of fluid flow in the closed position. The seal member engages the valve seat and seals the fluid conduit in the closed position.

Butterfly valves are used in a wide variety of applications. Different applications may involve liquids, gases and vacuum. Some applications may require a long operating life, with frequent cycling between the open and closed positions, and low particulate generation. An example of such an application is in equipment for vacuum processing of semiconductor wafers. As semiconductor device geometries decrease in size and circuit densities increase, semiconductor wafers are increasingly sensitive to particulate contamination. Components within the vacuum envelope of the processing chamber, such as butterfly valves in vacuum lines, are potential sources of particulate contamination. Furthermore, the failure of a butterfly valve may require all or part of a semiconductor fabrication line to shut down, thereby adversely affecting throughput. Accordingly, long operating life and low particulate generation are important butterfly valve characteristics.

Movement of the seal member into and out of engagement with the valve seat is a potential source of particulate contamination and wear. To alleviate these problems, prior art butterfly valve designs have employed combinations of rotary movement and linear movement of the seal member. Butterfly valves which operate by rotating the seal member from an open position into alignment with a valve seat, followed by linear movement of the seal member into engagement with the valve seat, are disclosed in U.S. Pat. No. 4,817,916, issued Apr. 4, 1989 to Rawstron; U.S. Pat. No. 4,921,212, issued May 1, 1990 to deQuay; and U.S. Pat. No. 5,330,157, issued Jul. 19, 1994 to Dern et al. Each of the disclosed butterfly valves includes a cam arrangement. A shut-off valve which includes a shifter rod and sliding guide closure mechanism is disclosed in U.S. Pat. No. 4,634,094, issued Jan. 6, 1987 to Geiser. All of the known prior art butterfly valve configurations have had one or more disadvantages, including limited operating life and high particulate generation.

SUMMARY OF THE INVENTION

According to a first aspect of the invention, a butterfly valve is provided. The butterfly valve comprises a valve housing having a fluid conduit and defining a valve seat, a seal plate assembly including a seal plate, and a closure assembly. The closure assembly moves the seal plate between an open position, an intermediate position wherein the seal plate is retracted from the valve seat, and a closed position wherein the seal plate is in sealed engagement with the valve seat.

The closure assembly comprises a main shaft mounted in the valve housing and rotatable about a longitudinal axis thereof, a crank shaft concentrically positioned within the main shaft and rotatable about the longitudinal axis, a hub affixed to the main shaft and rotatable with the main shaft, the hub being movably coupled to the seal plate assembly to permit translation of the seal plate assembly with respect to the hub, a roller mounted to the crank shaft for eccentric rotation about the longitudinal axis, the roller engaging the seal plate assembly, and one or more springs coupled between the seal plate assembly and the hub for biasing the seal plate toward the intermediate position.

The butterfly valve may be provided with a valve actuator or may be provided with a handle for manual operation. The valve actuator may be connected to the crank shaft for rotating the crank shaft about the longitudinal axis, wherein the seal plate is rotated from the open position to the intermediate position by rotation of the main shaft and the hub, and wherein the seal plate is translated from the intermediate position to the closed position by rotation of the crank shaft relative to the main shaft and eccentric rotation of the roller about the longitudinal axis.

The main shaft may comprise a solid shaft coupled to one side of the hub and rotatably mounted to the valve housing, and a hollow shaft coupled to the other side of the hub and rotatably mounted to the valve housing. The crank shaft may be a solid shaft having an eccentric configuration and may be mounted within the hollow shaft.

The solid shaft may include a flat surface. The butterfly valve may further comprise a first stop mounted to the valve housing for engaging the flat surface on the solid shaft when the main shaft is rotated to a first position corresponding to the open position of the seal plate, and a second stop mounted to the valve housing for engaging the flat surface of the solid shaft when the main shaft is rotated to a second position corresponding to the intermediate position of the seal plate. The main shaft and the crank shaft may rotate through about 90° between the first position and the second position. The crank shaft may rotate relative to the main shaft by about 180° with the flat surface on the solid shaft in contact with the second stop to thereby move the seal plate from the intermediate position to the closed position.

The seal plate assembly may include guide pins that slide in holes in the hub during translation of the seal plate relative to the hub. The seal plate assembly may further comprise a keeper plate for retaining the springs.

BRIEF DESCRIPTION OF THE DRAWINGS

For a better understanding of the present invention, reference is made to the accompanying drawings, which are incorporated herein by reference and in which:

FIG. 2 is a cross-sectional side view of the butterfly valve of FIG. 1 with the seal plate in the intermediate position;

FIG. 3 is a cross-sectional side view of the butterfly valve of FIG. 1 with the seal plate in the closed position;

FIG. 7 is a cross-sectional side view of the butterfly valve of FIG. 1, showing a stop that defines the open position; and FIG. 8 is a cross-sectional side view of the butterfly valve of FIG. 1, showing a stop that defines the intermediate position.

DETAILED DESCRIPTION

Figure 1:
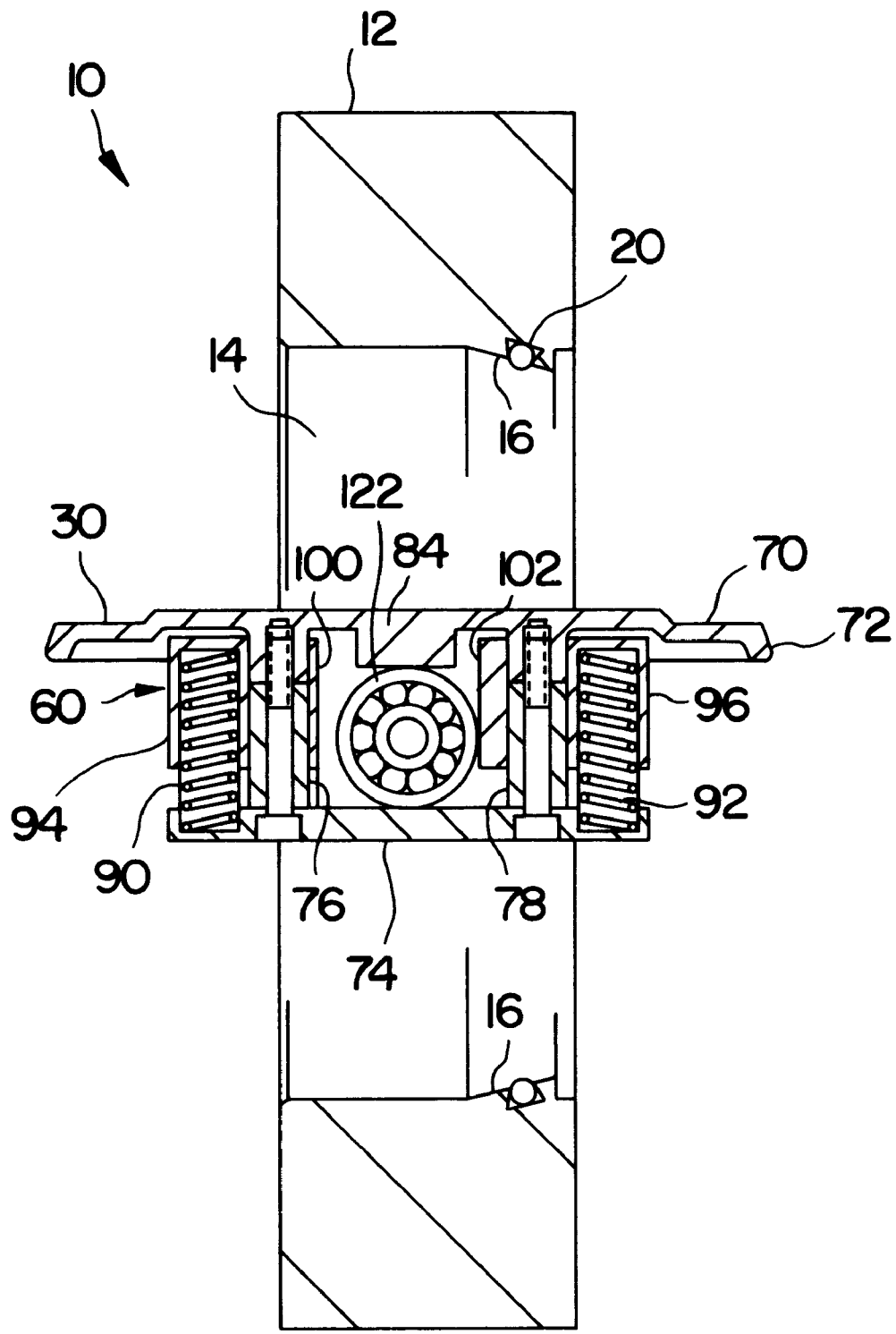
FIG. 1 is a cross-sectional side view of an embodiment of a butterfly valve in accordance with the invention, with the seal plate in the open position.

An embodiment of a butterfly valve incorporating features of the present invention is shown in FIGS. 1–8. Like elements in FIGS. 1–8 have the same reference numerals.

A butterfly valve 10 includes a valve housing 12 having a fluid conduit 14 for passage of a gas or a liquid. The gas pressure may be low in the case of vacuum applications of the butterfly valve. Valve housing 12 defines a valve seat 16 for engagement with a seal plate as described below. Fluid conduit 14 may be generally cylindrical, and valve seat 16 may be frustoconical. Preferably, the valve seat 16 is provided with an elastomer O-ring 20 for ensuring a fluid-tight seal between the seal plate and the valve seat. Valve housing 12 may further include a plurality of mounting holes 22 (FIG. 4).

Figure 4:
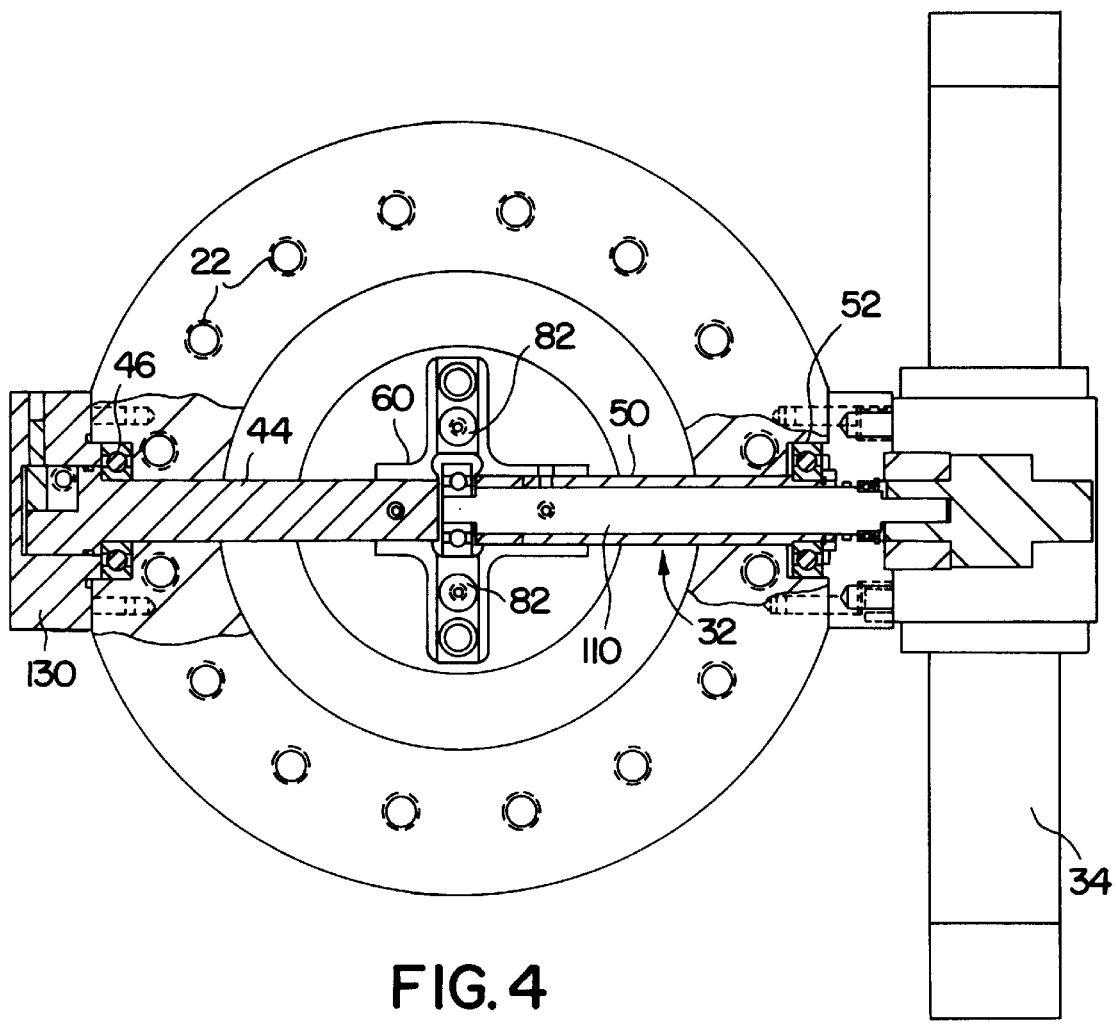
FIG. 4 is an end view, partly in cross-section, of the butterfly valve of FIG. 1 as viewed along the fluid conduit.
Figure 5:
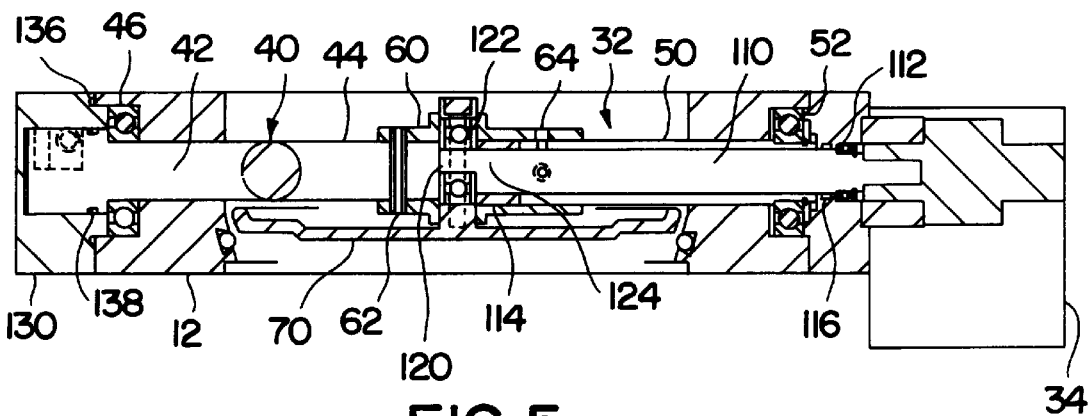
FIG. 5 is a cross-sectional top view of the butterfly valve of FIG. 1, with the seal plate in the intermediate position.
Figure 6:
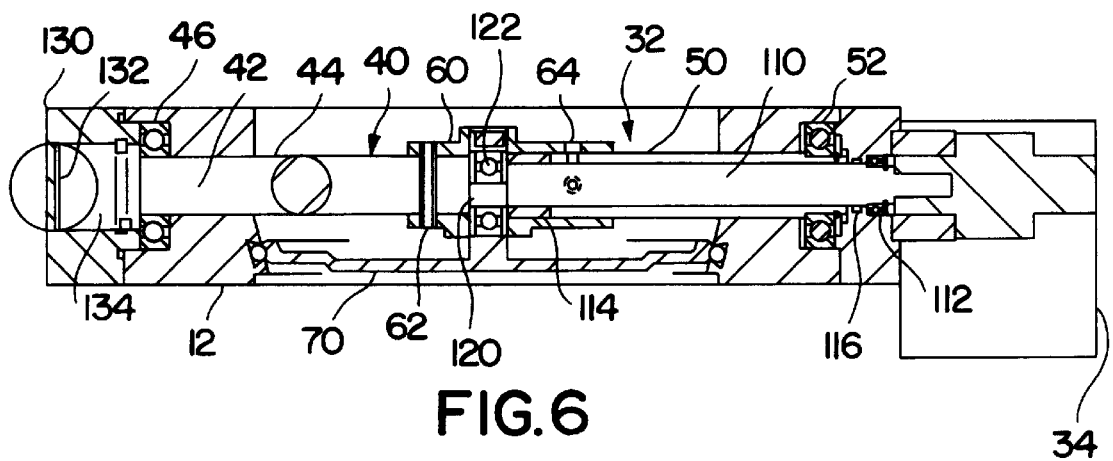
FIG. 6 is a cross-sectional top view of the butterfly valve of FIG. 1, with the seal plate in the closed position.

Butterfly valve 10 further includes a seal plate assembly 30 and a closure assembly 32 (best shown in FIGS. 4–6). Butterfly valve 10 may include a valve actuator 34. Under control of the closure assembly 32 and the valve actuator 34, seal plate assembly 30 is movable between an open position shown in FIG. 1, an intermediate position shown in FIGS. 2 and 5, and a closed position shown in FIGS. 3 and 6. In the open position, seal plate assembly 30 is rotated away from valve seat 16 and fluid conduit 14 to permit passage of a liquid or a gas. In the intermediate position (FIG. 2), seal plate assembly 30 is rotated into alignment with valve seat 16 but is spaced from valve seat 16. In the closed position (FIG. 3), seal plate assembly 30 is translated from the intermediate position into engagement with valve seat 16, thereby sealing fluid conduit 14. In the closed position, butterfly valve 10 is closed. In another configuration, the actuator 34 is replaced with a handle or other suitable device for manual operation of the butterfly valve. The seal plate assembly 30 is of course movable in the opposite direction from the closed position to the open position. In both opening and closing, the seal plate assembly passes through the intermediate position.

Closure assembly 32 includes a main shaft 40, a crank shaft 110, a center hub 60, a ball bearing 122 and springs 90 and 92. As described below, closure assembly 32 is coupled between actuator 34 and seal plate assembly 30, and moves the seal plate assembly between the open and closed positions. Main shaft 40 is mounted in valve housing 12 and is rotatable about a longitudinal axis 42 of main shaft 40. As best shown in FIGS. 4–6, main shaft 40 has two parts, including a solid shaft 44 mounted for rotation in a ball bearing 46 and a hollow shaft 50 mounted for rotation in a ball bearing 52. Solid shaft 44 and hollow shaft 50 are fixedly attached to opposite sides of center hub 60. Thus, solid shaft 44, hollow shaft 50 and center hub 60 rotate as a unit about longitudinal axis 42.

Solid shaft 44 is inserted into a bore in one side of center hub 60 and is secured by a pin 62. Hollow shaft 50 is inserted into a bore in the opposite side of center hub 60 and is secured in position with a set screw 64. Thus, center hub 60 is fixed in position relative to solid shaft 44 and hollow shaft 50. Center hub 60 is coupled to seal plate assembly 30 to permit rotation of seal plate assembly 30 with center hub 60 and translation of seal plate assembly 30 with respect to center hub 60 as described below.

As best shown in FIGS. 1–3, seal plate assembly 30 includes a seal plate 70 that is generally disk-shaped and has a flange 72 at its outer periphery for engaging valve seat 16 and O-ring 20 in the closed position. Seal plate 70 is the closure member that blocks and seals fluid conduit 14 when the valve is closed. Seal plate assembly 30 further includes a keeper plate 74 and guide pins 76 and 78. Keeper plate 74 is spaced from seal plate 70 by guide pins 76 and 78, thereby defining a cavity 80. Seal plate 70, keeper plate 74 and guide pins 76 and 78 are secured together by machine screws 82. Seal plate 70 is provided with an abutment 84 that faces cavity 80 and provides a contact surface for ball bearing 122.

Springs 90 and 92 are positioned between seal plate assembly 30 and center hub 60 for biasing the seal plate assembly 30 toward the intermediate position. More particularly, springs 90 and 92 are mounted in recesses in keeper plate 74 and respective sleeves 94 and 96 defined by center hub 60. Springs 90 and 92 are compressed when the seal plate assembly 30 is in the closed position, shown in FIG. 3, and are extended when the seal plate 30 is in the intermediate position, shown in FIG. 2. Center hub 60 further defines a sleeve 100 for receiving guide pin 76 and a sleeve 102 for receiving guide pin 78. Guide pins 76 and 78 slide in sleeves 100 and 102, respectively, to provide linear translation of seal plate assembly 30 with respect to center hub 60 between the intermediate position and the closed position.

As best shown in FIGS. 4–6, crank shaft 110 is mounted within hollow shaft 50 and is rotatable about longitudinal axis 42. Crank shaft 110 is rotatably secured in valve housing 10 by a ball bearing 112 and is rotatably secured in center hub 60 by a needle bearing 114. Crank shaft 110 is preferably solid. Actuator 34 is secured to one end of crank shaft 110, so that crank shaft 110 may be rotated about longitudinal axis 42 when actuator 34 is energized. In the other configuration described above, a handle is secured to one end of crank shaft 110. An elastomer ring 116 provides a seal between the crank shaft 110 and valve housing 12. Crank shaft 110 is provided at the end within center hub 60 with an extension pin 120 that is eccentrically located with respect to longitudinal axis 42. Eccentric extension pin 120 causes crank shaft 110 to function as an eccentric shaft. A roller, typically implemented as a ball bearing 122, is mounted on extension pin 120. The outer race of ball bearing 122 may rotate about a roller axis 124 that is parallel to and spaced from longitudinal axis 42. In addition, the entire ball bearing 122 rotates eccentrically with respect to longitudinal axis 42 as crank shaft 110 rotates. As described below, the eccentric movement of ball bearing 122 causes seal plate assembly 30 to move between the intermediate position and the closed position.

A bearing cap 130 is secured to valve housing 12 as shown in FIGS. 4–8. Bearing cap 130 retains ball bearing 46 within valve housing 12 and includes a recess 132 for receiving an enlarged end 134 of solid shaft 44. An elastomer ring 136 provides a seal between bearing cap 130 and valve housing 12; and an elastomer ring 138 provides a seal between bearing cap 130 and solid shaft 44. As shown in FIGS. 7 and 8, shaft end 134 is provided with a flat surface 140 that engages a first stop 142, as shown in FIG. 7, and a second stop 144, as shown in FIG. 8. Each of the stops 142 and 144 may be implemented as a set screw that is threaded into bearing cap 130 and extends into recess 132 in bearing cap 130. With reference to FIGS. 7 and 8, main shaft 44 may be rotated between a first position defined by first stop 142, as shown in FIG. 7, and a second position defined by second stop 144, as shown in FIG. 8. In the first position, first stop 142 contacts flat surface 140, and in the second position, second stop 144 contacts flat surface 140. The first position defined by first stop 142 corresponds to the open position of seal plate assembly 30, as shown in FIG. 2. The second position of solid shaft 44 defined by second stop 144 corresponds to the intermediate position of seal plate assembly 30, as shown in FIG. 1. In addition, solid shaft 44 remains in the second position defined by second stop 144 as seal plate assembly 30 is translated to the closed position by rotation of the crank shaft 110. It will be understood that stops 142 and 144 may be adjusted so as to adjust the open position and the intermediate position, respectively, of seal plate assembly 30. Preferably, solid shaft 44 is rotated by 90° between first stop 142 and second stop 144.

Operation of the butterfly valve will now be described. In moving between the open position shown in FIG. 1 and the intermediate position shown in FIG. 2, actuator 34 rotates crank shaft 110 about axis 42. Between the open position and the intermediate position, main shaft 40 is free to rotate, and springs 90 and 92 maintain a fixed relationship between seal plate assembly 30 and center hub 60. Furthermore, ball bearing 122 and crank shaft 110 are maintained in fixed relationship to seal plate assembly 30 and center hub 60 between the open position and the intermediate position. Thus, upon rotation of crank shaft 110 from the open position to the intermediate position, main shaft 40, center hub 60 and seal plate assembly 30 rotate with crank shaft 110. As a result, seal plate 70 rotates through about 90° between the open position shown in FIG. 1 and the intermediate position shown in FIG. 2. As further shown in FIGS. 1 and 2, ball bearing 122 rotates eccentrically about axis 42 by 90° between the open position and the intermediate position.

When the closure assembly 32 reaches the intermediate position, flat surface 140 (FIG. 7) of solid shaft 44 contacts second stop 144, and further rotation of main shaft 40 is prevented. However, crank shaft 110 continues to be rotated by actuator 34 and therefore rotates relative to the now-stationary main shaft 40. Ball bearing 122 continues to rotate eccentrically about axis 42 and bears against abutment 84 on seal plate 70. The force exerted by actuator 34 through crank shaft 110 and ball bearing 122 causes springs 90 and 92 to be compressed and seal plate assembly 30 to be translated linearly with respect to center hub 60. More particularly, seal plate assembly 30 is translated by sliding movement of guide pins 76 and 78 in sleeves 100 and 102, respectively, of center hub 60. As shown in FIGS. 2 and 3, ball bearing 122 rotates about axis 42 by about 180° between the intermediate position and the closed position. As a result, seal plate 70 is translated relative to center hub 60 and main shaft 40 into engagement with valve seat 16 and O-ring 20, thereby closing and sealing fluid conduit 14.

In opening the butterfly valve 10, the operations described above are simply reversed. That is, actuator 34 rotates crank shaft 110, causing ball bearing 122 to rotate eccentrically about axis 42 and to bear against keeper plate 74, so that seal plate assembly 30 is retracted from valve seat 16 and O-ring 20 to the intermediate position. In retracting seal plate assembly 30 from the closed position, the forces of springs 90 and 92 are combined with the force of ball bearing 122 on keeper plate 74 to retract seal plate 70, thereby overcoming any tendency for seal plate 70 to stick in the closed position. From the intermediate position, main shaft 40 is free to rotate about axis 42 toward the open position. Thus, the closure assembly, including seal plate assembly 30, center hub 60, main shaft 40, ball bearing 122 and crank shaft 110 rotate as a unit between the intermediate position and the open position. When flat surface 140 (FIG. 8) of solid shaft 44 contacts first stop 142, the seal plate 70 is in the open position shown in FIG. 1, and further rotation of the closure assembly 32 is prevented.

The disclosed butterfly valve exhibits a long operating life and low particulate contamination. Because the closure assembly utilizes ball bearing 122 for linear translation between the intermediate position and the closed position, rubbing contact between ball bearing 122 and the inside surfaces of cavity 80 is minimal, and particulate generation is very low. A butterfly valve constructed as shown in FIGS. 1–8 and described above was successfully tested for over one million cycles.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A butterfly valve comprising:
   a valve housing having a fluid conduit and defining a valve seat;
   a seal plate assembly including a seal plate; and
   a closure assembly for moving said seal plate between an open position, an intermediate position wherein said seal plate is retracted from said valve seat, and a closed position wherein said seal plate is in sealed engagement with said valve seat, said closure assembly comprising:
   a main shaft mounted in said valve housing and rotatable about a longitudinal axis thereof, said main shaft comprising a flat surface;
   a first stop mounted to said valve housing for engaging said flat surface on said main shaft when said main shaft is rotated to a first position corresponding to the open position of said seal plate;
   a second stop mounted to said valve housing for engaging said flat surface on said main shaft when said main shaft is rotated to a second position corresponding to the intermediate position of said seal plate;
   a crank shaft concentrically positioned within said main shaft and rotatable about said longitudinal axis;
   a hub affixed to said main shaft and rotatable with said main shaft, said hub being movably coupled to said seal plate assembly to permit translation of said seal plate assembly with respect to said hub;
   a roller mounted to said crank shaft for eccentric rotation about said longitudinal axis, said roller engaging said seal plate assembly; and
   one or more springs mounted between said seal plate assembly and said hub for biasing said seal plate toward the intermediate position from the closed position, and retracting said seal plate toward the main shaft.

2. A butterfly valve as defined in claim 1 wherein said first and second stops are adjustable.

3. A butterfly valve as defined in claim 1 wherein said crank shaft is rotatable relative to said main shaft when the flat surface on said main shaft is in contact with said second stop.

4. A butterfly valve as defined in claim 1 wherein said main shaft and said crank shaft rotate through about 90 degrees between said first position and said second position and wherein said crank shaft rotates relative to said main shaft by about 180 degrees with the flat surface on said main shaft in contact with said second stop to thereby move said seal plate from said intermediate position to said closed position.

5. A butterfly valve as defined in claim 1 wherein said roller comprises a ball bearing.

6. A butterfly valve as defined in claim 1 wherein said main shaft comprises a solid shaft coupled to one side of said hub and rotatably mounted to said valve housing, and a hollow shaft coupled to the other side of said hub and rotatably mounted to said valve housing, wherein said crank shaft is mounted within said hollow shaft.

7. A butterfly valve as defined in claim 6 wherein said solid shaft includes a flat surface and wherein said butterfly valve further comprises a first stop mounted to said valve housing for engaging the flat surface on said solid shaft when said main shaft is rotated to a first position corresponding to the open position of said seal plate, and a second stop mounted to said valve housing for engaging the flat surface on said solid shaft when said main shaft is rotated to a second position corresponding to the intermediate position of said seal plate.

8. A butterfly valve as defined in claim 1 wherein said seal plate assembly includes guide pins that slide in holes in said hub during translation of said seal plate relative to said hub.

9. A butterfly valve as defined in claim 8 wherein said seal plate assembly further comprises a keeper plate for retaining said springs.

10. A butterfly valve as defined in claim 1 further comprising a valve actuator connected to said crank shaft for rotating said crank shaft about said longitudinal axis, wherein said seal plate is rotated from the open position to the intermediate position by rotation of said main shaft and said hub, and wherein said seal plate is translated from the intermediate position to the closed position by rotation of said crank shaft relative to said main shaft and eccentric rotation of said roller about said longitudinal axis.

11. A butterfly valve as defined in claim 1 further comprising a handle connected to said crank shaft for rotating said crank shaft about said longitudinal axis, wherein said seal plate is rotated from the open position to the intermediate position by rotation of said main shaft and said hub, and wherein said seal plate is translated from the intermediate position to the closed position by rotation of said crank shaft relative to said main shaft and eccentric rotation of said roller about said longitudinal axis.

12. A butterfly valve comprising:
 a valve housing having a fluid conduit and defining a valve seat;
 a seal plate assembly including a seal plate, said seal plate assembly defining a cavity; and
 a closure assembly for moving said seal plate between an open position, an intermediate position wherein said seal plate is retracted from said valve seat, and a closed position wherein said seal plate is in sealed engagement with said valve seat, said closure assembly comprising:
  a main shaft mounted in said valve housing and rotatable about a longitudinal axis thereof between the open position and the intermediate position;
  a crank shaft mounted in said valve housing and rotatable about said longitudinal axis between the open position and the closed position;
  a hub affixed to said main shaft and movably coupled to said seal plate assembly to permit translation of said seal plate assembly with respect to said hub;
  said main shaft comprising a solid shaft coupled to one side of said hub and rotatable mounted to said valve housing, and a hollow shaft coupled to the other side of said hub and rotatable mounted to said valve housing, said crank shaft mounted within said hollow shaft;
  a roller mounted to said crank shaft for eccentric rotation about said longitudinal axis, said roller located within the cavity of said seal plate assembly; and
  spring means mounted between said seal plate assembly and said hub for biasing said seal plate toward the intermediate position from the closed position, and retracting said seal plate toward the main shaft.

13. A butterfly valve as defined in claim 12 wherein said solid shaft includes a flat surface and wherein said butterfly valve further comprises a first stop mounted to said valve housing for engaging the flat surface on said solid shaft when said main shaft is rotated to a first position corresponding to the open position of said seal plate, and a second stop mounted to said valve housing for engaging the flat surface on said solid shaft when said main shaft is rotated to a second position corresponding to the intermediate position of said seal plate.

14. A butterfly valve as defined in claim 12 wherein said seal plate assembly further comprises a keeper plate and wherein said spring means comprises first and second springs mounted between said keeper plate and said hub.

15. A butterfly valve as defined in claim 14 wherein said seal plate assembly further comprises guide pins that slide in holes in said hub during translation of said seal plate assembly relative to said hub.

16. A butterfly valve as defined in claim 12 wherein said roller comprises a ball bearing mounted on an extension of said crank shaft that is eccentrically located with respect to said longitudinal axis.

17. A butterfly valve as defined in claim 12 further comprising a valve actuator connected to said crank shaft for rotating said crank shaft about said longitudinal axis, wherein said seal plate is rotated from the open position to the intermediate position by rotation of said main shaft and said hub, and wherein said seal plate is translated from the intermediate position to the closed position by rotation of said crank shaft relative to said main shaft and eccentric rotation of said roller about said longitudinal axis.

18. A butterfly valve as defined in claim 12 further comprising a handle connected to said crank shaft for rotating said crank shaft about said longitudinal axis, wherein said seal plate is rotated from the open position to the intermediate position by rotation of said main shaft and said hub, and wherein said seal plate is translated from the intermediate position to the closed position by rotation of said crank shaft relative to said main shaft and eccentric rotation of said roller about said longitudinal axis.

\* \* \* \* \*